United States Patent
Teshima et al.

(10) Patent No.: US 7,134,850 B2
(45) Date of Patent: Nov. 14, 2006

(54) FITTED ASSEMBLY BELLOWS PUMP

(75) Inventors: Kazukiyo Teshima, Sanda (JP); Hitoshi Kawamura, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 289 days.

(21) Appl. No.: 10/720,477

(22) Filed: Nov. 25, 2003

(65) Prior Publication Data

US 2004/0170511 A1  Sep. 2, 2004

(30) Foreign Application Priority Data

| Dec. 3, 2002 | (JP) | ............................. 2002-351578 |
| Mar. 3, 2003 | (JP) | ............................. 2003-055924 |
| Mar. 3, 2003 | (JP) | ............................. 2003-055925 |

(51) Int. Cl.
*F04B 43/06* (2006.01)
*F04B 17/00* (2006.01)

(52) U.S. Cl. ....................... 417/398; 417/472
(58) Field of Classification Search ................ 417/375, 417/398, 472
See application file for complete search history.

(56) References Cited

U.S. PATENT DOCUMENTS

| 1,722,791 A * | 7/1929 | Gillen ...................... 417/380 |
| 2,142,329 A * | 1/1939 | Nika, Jr. et al. ............ 417/199.1 |
| 4,442,957 A * | 4/1984 | Neal et al. .................... 222/207 |
| 6,024,345 A * | 2/2000 | Nishio .......................... 267/165 |
| 6,189,433 B1 | 2/2001 | Harada |
| 6,322,338 B1 * | 11/2001 | Nishio .......................... 417/540 |
| 6,364,640 B1 * | 4/2002 | Nishio et al. ................ 417/540 |
| 6,488,487 B1 * | 12/2002 | Minato ........................ 417/540 |
| 6,547,541 B1 | 4/2003 | Nishio |
| 6,954,761 B1 * | 10/2005 | Azuma ........................ 707/102 |
| 2002/0014291 A1 * | 2/2002 | Ito et al. ...................... 148/586 |
| 2003/0053921 A1 | 3/2003 | Nishio |

FOREIGN PATENT DOCUMENTS

| DE | 24 47 646 | 4/1976 |
| EP | 1156216 | 11/2001 |
| JP | SHO 55-121990 | 8/1980 |
| JP | 2001-355568 | 12/2001 |
| JP | 2002-174180 | 6/2002 |

* cited by examiner

*Primary Examiner*—Charles G. Freay
(74) *Attorney, Agent, or Firm*—Smith, Gambrell & Russell, LLP

(57) ABSTRACT

In a pump employing a bellows, individual members are formed from resins and pump components including a fitted assembly formed by fitting plural members with each other form a structure unit which is tightly inserted in an external cover and constrained on the opposite ends thereof for come off prevention. Thus, the distortion or deformation of the members during assembly is obviated and hence, a good sealing performance is achieved.

9 Claims, 11 Drawing Sheets

FITTED ASSEMBLY BELLOWS PUMP

FIELD OF THE INVENTION

The present invention relates to a pump for fluid transportation or more particularly to a pump used for circulation or transportation of a chemical fluid in a semiconductor fabrication apparatus.

DESCRIPTION OF THE PRIOR ART

Conventional pumps used for circulation or transportation of the chemical fluid in the semiconductor fabrication apparatus generally adopt a structure wherein an air cylinder as drive means, a bellows free to extend or contract following the change in the volume of a pump chamber and sealing the fluid therein, a check valve for restricting the flow direction of the fluid, and other plural members are coaxially arranged along an axis of the air cylinder and are fastened to one another in side-by-side relation by means of an axially elongated rod, bolt and the like (see, for example, Japanese Unexamined Patent Publication No. 2002-174180). Furthermore, a plurality of bolts are also used for securing an end of the bellows to a piston side.

Unfortunately, the conventional pump of the above construction may sometimes encounter a problem that the plural members cannot be accurately centered with one another because of dimensional errors of the members or a manner to arrange the members in side-by-side relation. That is, the center axes of the members cannot be accurately aligned with one another. In such a case where the members cannot be properly positioned relative to one another, fastening the members may cause torsion between the members or the distortion of the members themselves.

On the other hand, a plurality of bolts at an end of the bellows need to be fastened with an equal load such as to ensure sealing performance. In practice, however, the fastening load is prone to unequal among the bolts. When a plural number of bolts are used, the individual bolts are differently decreased in the fastening load due to aging (associated with resin creep and the like). The different fastening loads on the plural bolts lead to the deformation of the members such as the bellows, which results in the leakage of the chemical fluid.

In view of the foregoing, it is an object of the present invention to provide a pump which is arranged to be assembled without causing the distortion or deformation of the members and thus is capable of achieving a consistent sealing performance.

OBJECT AND SUMMARY OF THE INVENTION

In accordance with the present invention, a pump is arranged to generate a pumping action based on reciprocal movements of an air cylinder portion to thereby suck and discharge a fluid via valves, and is characterized in that pump components including a fitted assembly formed by fitting a plurality of members with each other form a structure unit which is constrained on the opposite ends thereof for come-off prevention as tightly inserted in an external cover.

In the pump of the above construction, the plural members are positioned at places by fitting with one another as well as by being tightly inserted in the external cover. In addition, the members in the external cover are retained in this state. Furthermore, the individual members constituting the pump structure unit are fixed in the external cover by way of the constraint for come-off prevention. The pump assembled in this manner is free from the distortion or deformation of the members and hence, is capable of achieving a stable sealing performance. In addition, the plural members are fitted with one another to assume a mutually overlapping relation with respect to a fitting direction. Therefore, the pump has a more compact structure with respect to the fitting direction, as compared with a case where the members are simply arranged in side-by-side relation.

In another aspect of the present invention, the above pump may comprise a pump body including an in-flow passage and an out-flow passage for the fluid; a pump cylinder formed on one end of the pump body; a bellows formed from a resin and capable of being extended or contracted in the pump cylinder and along a center axis; an air cylinder portion for extending or contracting the bellows; and check valves disposed within the pump body facing a pumping chamber defined by the pump body, pump cylinder and bellows and alternately operative to open and close in conjunction with the extension and contraction of the bellows to thereby alternately suck and discharge the fluid, and may be characterized in that the fitted assembly formed by at least partially fitting the pump cylinder, bellows and air cylinder portion with each other is tightly inserted in the external cover and constrained on the opposite ends thereof for come-off prevention.

In this case, the members constituting the fitted assembly are positioned at places by fitting with each other and also by being tightly inserted in the external cover. In addition, these members are retained in this state. Furthermore, the members inserted in the external cover are fixed therein by way of the constraint for come-off prevention. The pump assembled in this manner is free from the distortion or deformation of the members and hence, is capable of achieving a stable sealing performance. Accordingly, the pump does not suffer an axial shift at the air cylinder portion, for example, so that a pumping function is not impaired due to malfunction caused by abnormal wear of the individual members of the air cylinder portion which results from the axial shift. Furthermore, the fitted assembly is formed by at least partially fitting the pump cylinder, bellows and air cylinder portion with each other and hence, these members include respective portions overlapped with each other with respect to the center axis (for example, a part of the air cylinder portion can be located in the bellows). Thus, a span with respect to the center axis can be decreased by a quantity of the overlapping portions, so that the pump may be made more compact.

In still another aspect of the present invention, the pump may comprise a pump body including an in-flow passage and an out-flow passage for the fluid; a pump cylinder provided at one end of the pump body; a bellows capable of being extended or contracted in the pump cylinder and along a center axis and cooperating with the pump body and pump cylinder to form a pumping chamber; an air cylinder portion for extending or contracting the bellows; and an external cover enclosing therein the pump cylinder, bellows and air cylinder portion and threadedly engaging the pump body for fastening with each other along the center axis while cooperating with the pump body to clamp these members therebetween with respect to the center axis, and may be characterized in that sealing portions in opposed relation are provided in correspondence to a connection area between at least one of the pump body and bellows and the external cover and are wedged in each other according to the fastening by the external cover and pump body to thereby form a seal.

Such a pump has a construction of an external fluid type wherein the fluid flows directly into the pump cylinder. The members in the external cover may be uniformly fastened by axially fastening the external cover and the pump body, in threaded engagement, to each other, so that the deformation of the members is prevented to achieve a good sealing performance. The sealing portions in opposed relation are wedged in each other according to the fastening by the external cover and the pump body, thereby to form the seal. This produces a radial surface pressure to provide a strong sealing power and hence, the pump of the external fluid type featuring an excellent sealing performance is provided.

In still another aspect of the present invention, the pump may comprise a pump body including an in-flow passage and an out-flow passage for the fluid; a pump cylinder provided at one end of the pump body; a bellows capable of being extended or contracted in the pump cylinder and along a center axis and cooperating with the pump body and pump cylinder to form a pumping chamber; an air cylinder portion for extending or contracting the bellows; an external cover enclosing therein the pump cylinder, bellows and air cylinder portion and threadedly engaging the pump body for fastening with each other along the center axis while cooperating with the pump body to clamp these members therebetween with respect to the center axis; and a plurality of check valves juxtaposed on the in-flow passage of the pump body.

In this case, the fluid in the in-flow passage through the pump body is divided into flows into the plural check valves, so that the fluid flowing through one check valve is lowered in flow velocity. Therefore, a flow-velocity drop at a moment that the flow velocity is decreased to 0 is reduced such that water hammer is alleviated. Furthermore, the lowered flow velocity eliminates a problem that the pressure of the fluid flowing through the check valve is lowered to below the saturation vapor pressure and hence, the production of bubbles is avoided. As a result, the occurrence of cavitation is prevented.

DESCRIPTION OF THE PREFERRED EMBODIMENTS

Figure 1:
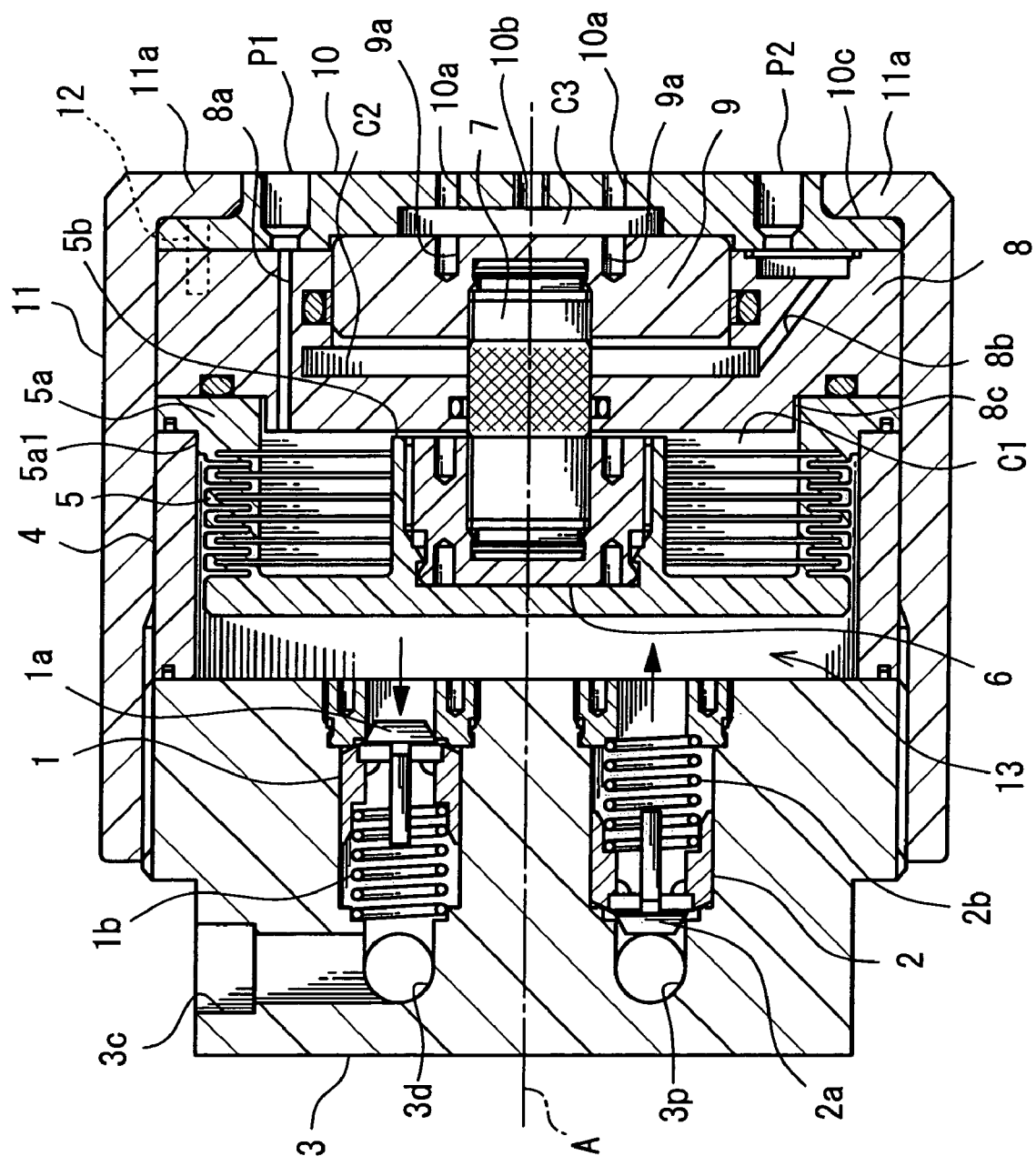
FIG. 1 is a sectional view showing a pump according to a first embodiment of the present invention.

FIG. 1 is a sectional view showing a pump according to a first embodiment of the present invention. The pump is used for, for example, circulation or transportation of a chemical fluid (such as containing fluorine) in a semiconductor fabrication apparatus installed in a clean room. The pump is of a horizontal type and is generally installed in a position shown in the figure (the upper part is the top of the pump, whereas the lower part is the bottom thereof as seen in the figure). The pump is composed of a plurality of members which are coaxially arranged on a common center axis A and which each essentially have a circular outer periphery and a circular inner periphery. Specifically, the pump includes, as essential components, a pump body 3 having two pairs of check valves 1, 2 (to be specifically described hereinlater); a cylindrical pump cylinder 4; a bellows 5 having a double cylinder structure, an outer cylinder portion 5a of which is extendable along the center axis A in a bellows fashion; a spacer 6 threadedly engaged with an inside of an inner cylinder portion 5b of the bellows 5 (but a left end of the spacer 6 is fitted in the bellows 5); a shaft 7 shaped like a round rod and threadedly engaged with the spacer 6 (but a left end of the shaft 7 is fitted in the spacer 6); a ring-like piston case 8 allowing the shaft 7 to extend therethrough; a piston 9 threadedly engaged with the shaft 7 (a right end thereof fitted in the piston 9)and inserted in the piston case 8 as allowed to slidably move along the center axis A; a piston cover 10 covering a respective end of the piston case 8 and the piston 9; and a cylindrical external cover 11 for totally or partially enclosing therein the above members. Incidentally, the pump cylinder 4 may be formed integrally with the pump body 3 (by machining or the like).

The spacer 6, shaft 7, piston case 8, piston 9 and piston cover 10 constitute an air cylinder portion as located on a right side of the bellows 5 as a bulkhead. Need for externally attaching the air cylinder is eliminated by arranging the air cylinder in this manner. Hence, the whole body of the pump is made compact. The pump having the compact body is preferred because the fabrication apparatus occupies a smaller area in the clean room. Furthermore, if a minor amount of wear particles should be produced from the air cylinder portion during use over an extended period of time, there is no fear of contamination of the clean room because very little particles are scattered out of the pump.

In the above construction, the bellows 5 is fitted in the pump cylinder 4 at an outer circumferential face 5a1 of a base of the outer cylinder portion 5a thereof. The spacer 6 and the piston case 8 are in mutually fitted relation (including threaded engagement) via the shaft 7, while the spacer 6 is fitted in the inner cylinder portion 5b of the bellows 5. A column-like projection 8c is formed on a left end of the piston case 8. An outside diameter of the projection 8c may be made substantially equal to an inside diameter of the outer cylinder portion 5a of the bellows 5 such that the piston case 8 can be fitted in the bellows 5. In addition, the piston 9 is in fitted relation with the piston case 8 and the shaft 7. The piston cover 10 and the piston case 8 are in a relation equivalent to a mutually fitted relation via a plurality of positioning pins 12 (only one of which is shown). Accordingly, the pump cylinder 4, bellows 5, spacer 6, shaft 7, piston case 8, piston 9, piston cover 10 and the others including sealing members (e.g., O ring) are so constructed as to be fitted with each other thereby to be positioned at places without the aid of fastening members such as rod, bolt and the like.

On the other hand, the external cover 11 is formed with a stopper portion 11a extended inwardly from a right end thereof. The pump body 3 is formed with a male thread on its outer circumferential face, and the external cover 11 is formed with a female thread on its inner periphery. Thus, the pump body 3 and the external cover 11 are threadedly engaged with each other. Such a threaded engagement permits the members inside the external cover 11 to be uniformly fastened to one another. Particularly, a consistent degree of fastening as a whole is provided by the threaded engagement because the pump body 3 and the external cover 11 each define a single thread of a relatively large diameter. Furthermore, a contact surface between the pump body 3 and the pump cylinder 4, a contact surface between the pump cylinder 4 and the outer cylinder portion 5a of the bellows 5, and a contact surface between the outer cylinder portion 5a and the piston case 8 are subjected to a substantially equal pressure along the center axis A. Thus, the bellows 5, pump cylinder 4 and pump body 3 receiving the substantially equal pressure at their contact surfaces cooperate to define a fluid space 13 as a "pumping chamber" which does not encounter deformation caused by the distortion of the members or the like or the inconsistent fastening load. Therefore, leakage of the chemical fluid caused by these factors can be prevented. Consequently, a stable, favorable sealing performance can be achieved.

The interior of the above bellows 5 defines a first air chamber C1 for allowing the piston 9 to be advanced leftwardly (as seen in the figure). The first air chamber C1 is communicated with a port P1 via a hole 8a extended through the piston case 8. On the other hand, a second air chamber C2 is defined between a left end face of the piston 9 and the piston case 8 for allowing the piston 9 to be retracted. The second air chamber C2 is communicated with a port P2 via a hole 8b formed within the piston case 8.

A third air chamber C3 defined between a right end face of the piston 9 and the piston cover 10 is open via a hole 10b extended through the piston cover 10. Formed in the right end face of the piston 9 are holes 9a which have a diameter slightly smaller than holes 10a extended through the piston cover 10 and a coaxial positional relation therewith. A pin (not shown) is implanted in the smaller hole 9a so as to be loosely fitted in the hole 10a, thereby preventing the rotation of the piston 9 and hence the distortion of the bellows 5.

Figure 2:
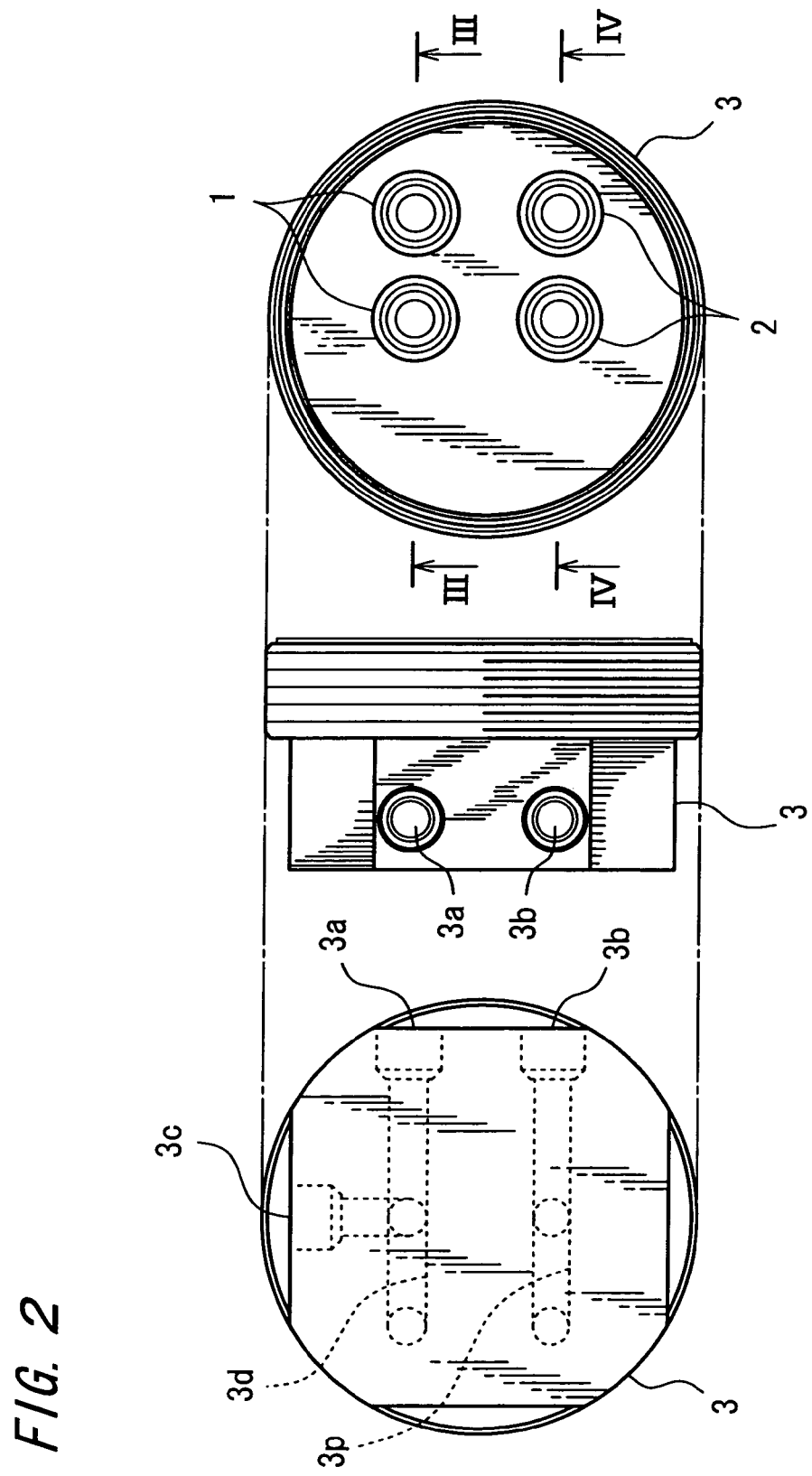
FIG. 2 is a group of diagrams showing an outward appearance of a pump body of the above pump.
Figure 3:
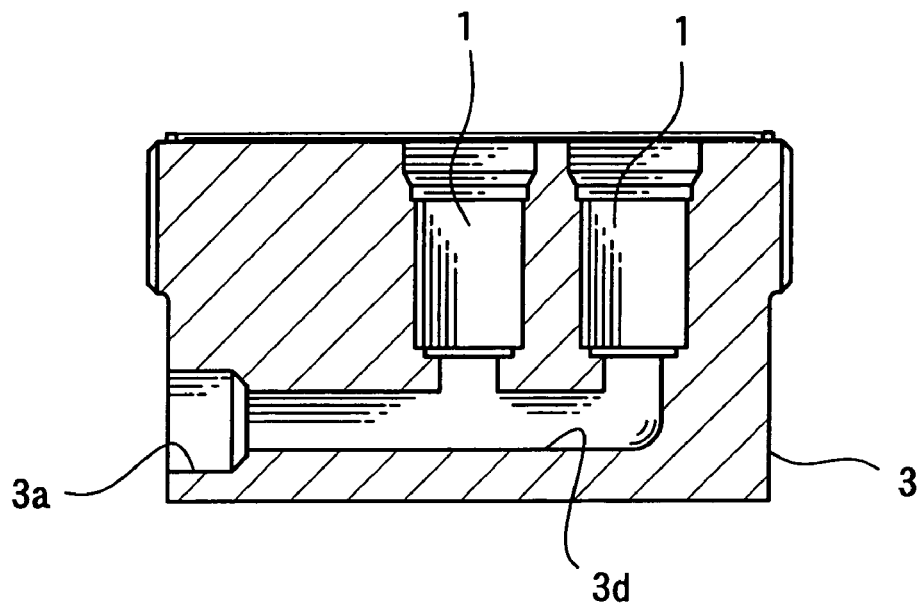
FIG. 3 and FIG. 4 are sectional views showing the above pump body.
Figure 4:
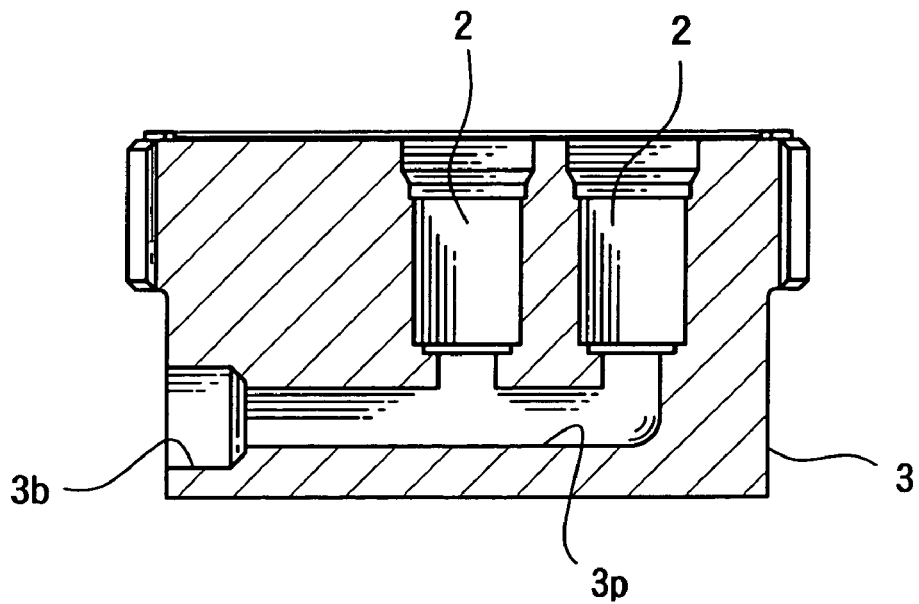

A diagram on the right-hand side of FIG. 2 depicts the pump body 3 as viewed along the leftward direction from the fluid space 13 in FIG. 1. A diagram at the center of FIG. 2 depicts the pump body 3 as viewed along the same direction in FIG. 1. A diagram on the left-hand side of FIG. 2 depicts the pump body 3 as viewed along the opposite direction to the right-hand diagram. FIG. 3 and FIG. 4 are sectional views taken on the lines III—III and IV—IV in FIG. 2, respectively. As shown in FIG. 2, the check valves 1, 2 are provided in a total number of four as fitted in the pump body 3. The upper pair of check valves 1 are for discharge. Each of the check valves 1 has a valve body 1a rightwardly biased by a spring 1b (formed from a resin) as seen in FIG. 1, thus allowing the chemical fluid to flow only in a direction indicated by an arrow. This pair of check valves 1 are disposed in parallel on a flow passage, whereas the chemical fluid in the fluid space 13 flows through a flow passage 3d formed in the pump body 3 so as to be discharged from the pump via an exit port 3a at a side face of the pump and an exit port 3c at a top portion thereof (see FIG. 2). The lower pair of check valves 2 are for suction. Each of the check valves 2 has a valve body 2a leftwardly biased by a spring 2b (formed from a resin) as seen in FIG. 1, thus allowing the chemical fluid to flow only in a direction indicated by an arrow. This pair of check valves 2 are disposed in parallel on a flow passage, whereas the chemical fluid flows through the flow passage 3p via a suction port 3b so as to be introduced into the fluid space 13 (see FIG. 2).

The above pump has a structure of external fluid type wherein the check valves 1, 2 are fitted in the pump body 3 and the fluid space 13 is defined in the pump cylinder 4. Because of such a pump structure, the fluid space 13 can be reduced to the minimum required size, which contributes to the reduction of pump span with respect to the center axis A. As shown in FIG. 1, the check valves 1, 2 do not protrude from an inside end face of the pump body 3 which faces the fluid space 13. This is more preferable in terms of the span reduction.

As to the material for the above members, the members having particular importance in contact surfaces, such as the pump body 3, pump cylinder 4 and bellows 5 may preferably be formed from a fluorine resin such as PTFE (polytetrafluoroethylene) or PFA (polytetrafluoroethylene-perfluoroalkyl vinyl ether-copolymer). The other members such as the spacer 6, shaft 7, piston case 8, piston 9, piston cover 10 and external cover 11 may preferably be formed from PP (polypropylene), PPS (polyphenylenesulfide), POM (polyoxymethylene) or the like. The check valves 1, 2 inclusive of the springs 1b, 2b contained therein may preferably be formed from PFA or PTFE. All the other members including the sealing members and O-rings may be formed from resin materials. That is, the members constituting the pump are all formed from resin materials. This excludes a fear of invasion of metal ions into a workpiece such as a semiconductor wafer, thus contributing to a consistent quality of semiconductor products.

According to FIG. 1, the bellows 5 and the shaft 7 are interconnected via the spacer 6. Such a connection via the spacer 6 increases the fastening strength although the resin materials are prone to insufficient fastening strength.

Figure 5:
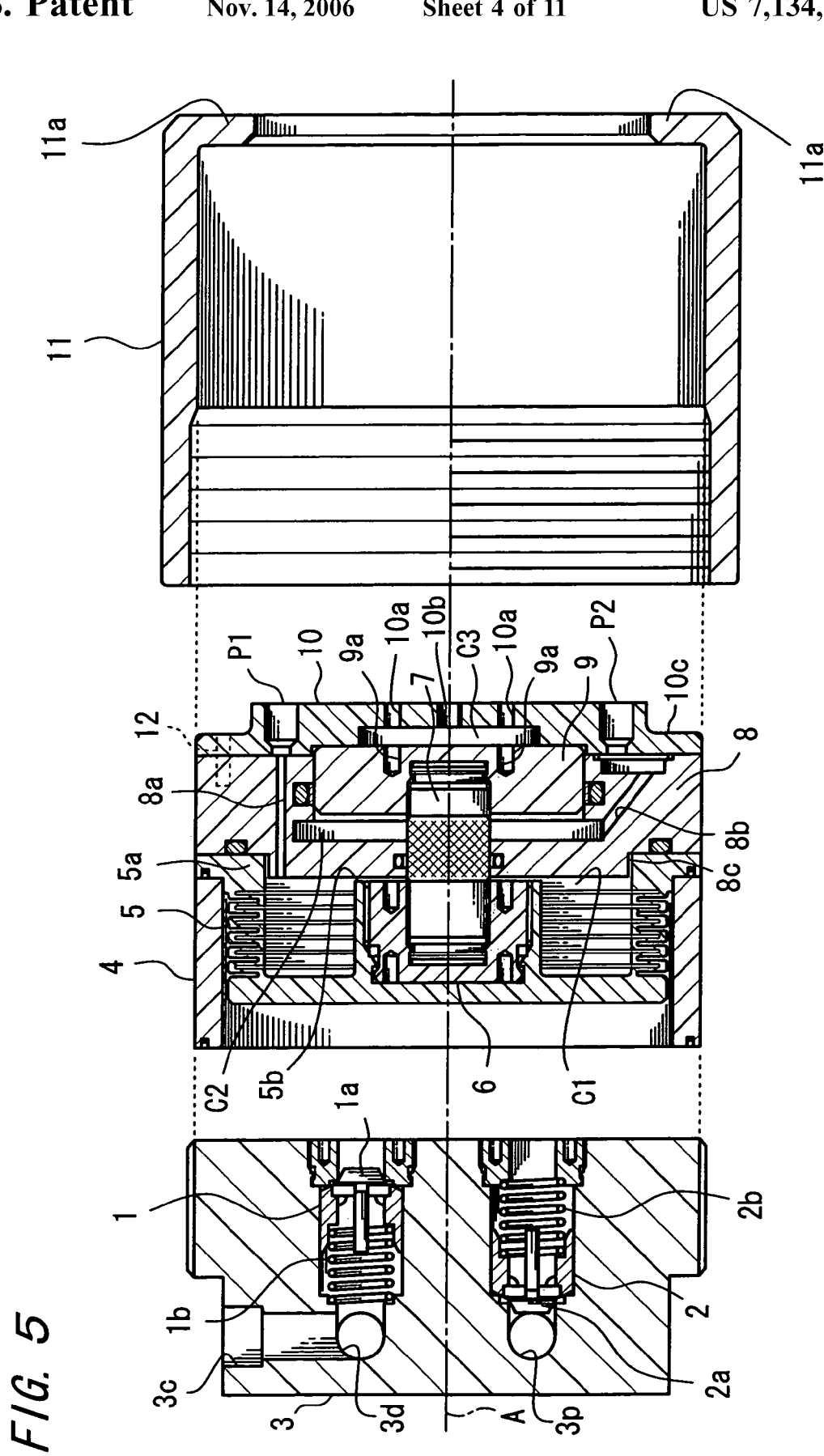
FIG. 5 is a sectional view showing how to assemble the above pump.

FIG. 5 is a sectional view showing how to assemble the above pump. Referring to the figure, the pump cylinder 4, bellows 5, spacer 6, shaft 7, piston case 8, piston 9, and piston cover 10 are in mutually fitted relation, as described above, such that these members may be positioned to places and centered on the common center axis A. Therefore, the centering between the air cylinder portion (6–10) and the bellows 5, which is difficult to accomplish, may be facilitated. The fitted assembly thus arranged is tightly inserted in the external cover 11 (substantially equivalent to tight fit with a clearance on the order of 0.2 mm, for instance). The insertion of the fitted assembly brings a circumferential edge 10c of the piston cover 10 into abutment against the stopper portion 11a of the external cover 11, whereby the fitted assembly thus inserted is constrained at its right end for come-off prevention. When the external cover 11 with its female thread engaged with the male thread of the pump body 3 is screwed in, the pump body 3 constrains the fitted assembly at its left end, thereby preventing the come-off of the fitted assembly. Thus, the fitted assembly is fixed to the position shown in FIG. 1 as confined between the pump body 3 and the stopper portion 11a.

The external cover 11 retains the pump cylinder 4, bellows 5, piston case 8 and piston cover 10, which practically make contact with the inner circumferential face of the external cover 11, in a manner to prevent the radial displacement of these members. Consequently, the other members tightly fitted with these members are also prevented from being radially displaced. That is, the external cover 11 radially positions the members accommodated therein and also stably retains these members in the positioned state. Even after assembly, therefore, the members are substantially free from the radial displacement as retained by the external cover 11.

Thus, the individual members constituting the pump structure are aligned on the center axis A as constrained in the external cover 11, so that these members are fixed in the state precisely positioned relative to one another. The pump assembled in this manner does not incur the distortion or deformation of the members over an extended period of time because they are fastened to one another without using the rods, bolts and the like which are employed by the prior art. Furthermore, such a pump does not suffer an axial shift at the air cylinder portion (6–10) and hence, the members of the air cylinder portion do not incur abnormal wear caused by the axial shift, the abnormal wear leading to the malfunction of the air cylinder portion and a decreased pumping function of the pump.

The fitted assembly is formed by at least partially fitting the pump cylinder 4, bellows 5 and the air cylinder portion with each other. This permits the reduction of the axial span by the quantity of the overlapping portions of the members (for instance, the shaft 7 of the air cylinder portion may be located inside the bellows 5). Thus, the pump can be made compact. This is preferred because the pump occupies a smaller area in the clean room, as mentioned supra.

According to the foregoing description with reference to FIG. 5, the pump cylinder 4, bellows 5, spacer 6, shaft 7, piston case 8, piston 9 and piston cover 10 are mutually fitted with each other to form the fitted assembly which is to be tightly inserted in the external cover 11. In an alternative approach, the individual members or sub-sets of the members fitted with each other to a degree may be sequentially inserted in the external cover 11 so that the fitted assembly may be assembled in the external cover 11.

The foregoing embodiment merely illustrates one example of the arrangement of the members contained in the external cover 11 and the present invention is not limited to this. In short, an equivalent working effect may be obtained by making an arrangement wherein the pump components including the fitted assembly formed by fitting the plural members with each other are tightly inserted in the external cover and are constrained at the opposite ends thereof for come-off prevention.

In the pump of the above construction (FIG. 1), a compressed air is supplied to the port P1 while the port P2 is exhausted or reduced in pressure, whereby the piston 9 along with the shaft 7 and spacer 6 are advanced so as to extend the bellows 5 leftwardly. Thus, the check valves 1 on the exit side are opened to discharge the chemical fluid via the exit ports 3a, 3c. Conversely, the compressed air is supplied to the port P2 while the port P1 is exhausted or reduced in pressure, whereby the piston 9 along with the shaft 7 and spacer 6 are retracted to thereby contract the bellows 5 to the position shown in the figure. Thus, the check valves 2 on the suction side are opened to suck in the chemical fluid via the suction port 3b. The repetition of such reciprocal movements generates the pumping action for transportation of the chemical fluid.

By juxtaposing the check valve pair 2 on the suction side, as described above, the chemical fluid is divided into two flows into the two check valves 2 during the suction step. As compared with a case where a single check valve 2 is mounted, therefore, a flow velocity of the chemical fluid through each of the check valves 2 is lowered. The lowered flow velocity results in a smaller flow-velocity drop at a moment that the flow velocity is decreased to 0 at the end of the suction step and hence, the water hammer is alleviated. Specifically, provided that P1 represents a fluid pressure pressing the valve body 2a of the check valve 2 in a direction to open the check valve shifted from the open position to the close position and that P2 represents a fluid pressure in the fluid space 13, P1 assumes damped oscillation due to the water hammer associated with the closure of the valve. The amplitude of the oscillation at this time is substantially reduced to half in comparison to the case where a single check valve 2 is provided. After the closure of the valve, therefore, a transitional period during which a relation between the fluid pressures may be P1>P2 is reduced to minimum, so that the chattering of the check valves 2 is significantly reduced. Furthermore, the lowered flow velocity does not entail the problem that the fluid pressure in the vicinity of the check valves 2 allowing the passage of the chemical fluid is lowered below the saturation vapor pressure. Hence, little bubbles are produced in the chemical fluid. As a consequence, occurrence of the cavitation can be avoided.

On the other hand, by juxtaposing the check valve pair 1 on the exit side, the chemical fluid is divided into two flows into the two check valves 1 during the discharge step. Therefore, the water hammer occurring at the end of the discharge step is reduced just as when the above suction step is terminated. Thus, the chattering of the check valves 1 is notably reduced. In addition, the production of cavitation is also prevented by the lowered flow velocity.

In this manner, the water hammer is reduced in both the suction and discharge steps, so that the occurrence of the oscillation impairing the sealing performance can be prevented. Furthermore, the service life of the check valves 1, 2 may be increased by virtue of the notable decrease of the chattering and the obviation of the cavitation.

It is preferred that a space between the juxtaposed check valves is equal to or less than three times the diameter r of the flow passage through the check valve. If the space exceeds this range, the check valves may suffer a serious lag between their opening or closing motion or the fluid may sustain an increased pressure loss by the time that the fluid reaches the check valve on the longer flow passage.

The arrangement wherein the pump is installed in a horizontal position with the center axis extended horizontally and wherein the check valves 1 for discharge are disposed at the upper position is advantageous in that gas (the air entered in the pump or gas produced from the chemical fluid) dwelling in the fluid space 13 (pumping chamber) tends to be automatically discharged from the exit ports 3a, 3c via the check valves 1. Accordingly, it is unlikely to occur that a pumping capacity is decreased by a large quantity of dwelling gas in the fluid space 13 to be filled with the chemical fluid. That is, the decrease of the pumping capacity can be avoided. It is inevitable that the air is present in the pump in an early stage of the activation of the pump. Therefore, the pump must be operated for air removal until the pump attains a stable pumping capacity.

However, the above arrangement prone to gas escape facilitates the gas removal at the early stage of the activation of the pump, so that the pumping capacity is stabilized in a short time.

In addition, the springs 1b, 2b suffers less fatigue because of the horizontal mounting of the check valves 1, 2 and hence, the springs last longer.

According to the foregoing embodiment, the check valves 1, 2 are provided in the respective number of two but three or more check valves may be provided where it is necessary. Even in a pump using a diaphragm instead of the bellows, an equivalent working effect may be obtained by employing the check valves 1, 2 arranged in the aforementioned manner.

Incidentally, a certain degree of effect may be obtained by providing the check valves in parallel only on the in-flow passage 3p.

Figure 6:
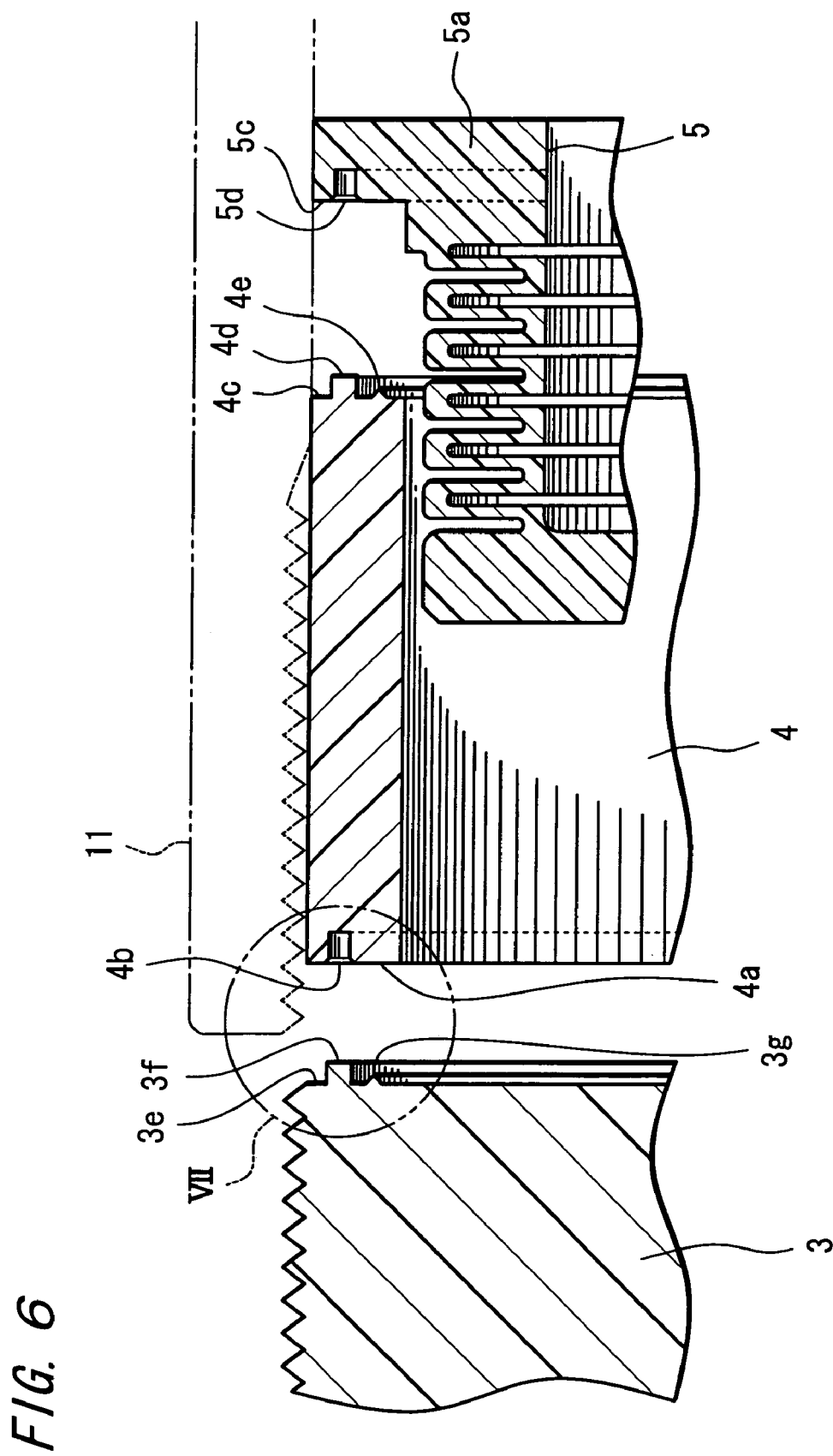
FIG. 6 is an enlarged sectional view showing the pump body, a pump cylinder and a bellows separated from one another along a center axis A of FIG. 1.

Next, a detailed description is made on a sealing structure for the pump cylinder 4, the pump body 3 and the bellows 5. FIG. 6 is an enlarged sectional view showing the pump body 3, the pump cylinder 4 and the bellows 5 separated from one another along the center axis A in FIG. 1. Referring to the figure, a ring-like projection 3f having a square sectional shape is formed on a right end face 3e of the pump body 3. Furthermore, a ring-like minor projection 3g is formed in the vicinity of an inward side of the projection 3f. The minor projection 3g has a triangular sectional shape and a smaller height than the projection 3f. On the other hand, a circular recess 4b is formed in a left end face 4a of the pump cylinder 4 in correspondence to the overall circumference of the projection 3f. Although the minor projection 3g confronts the left end face 4a of the pump cylinder 4, there is no recess or the like provided at place opposite the minor projection 3g. Such a minor projection 3g may be formed at the pump cylinder 4 rather than at the pump body 3.

Figure 7:
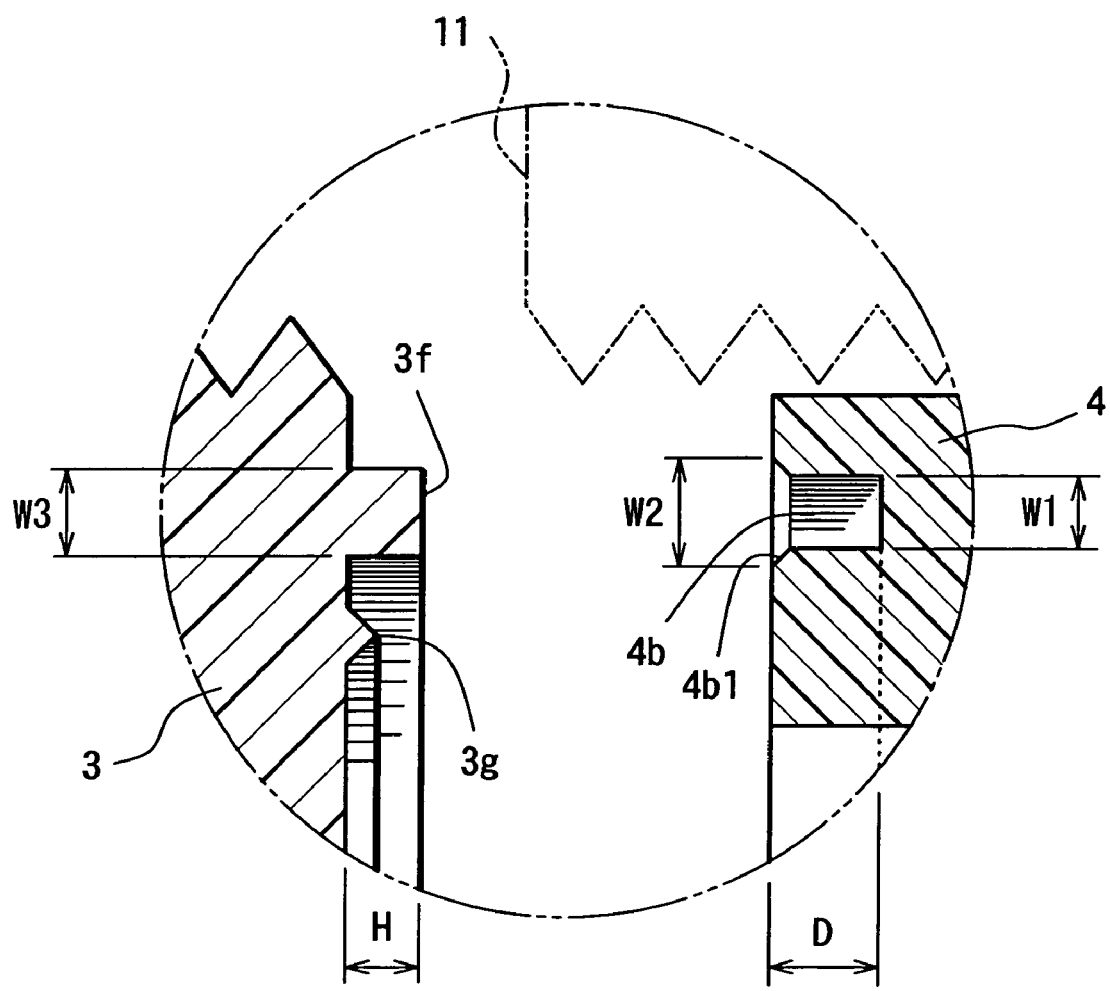
FIG. 7 is an enlarged sectional view showing a portion VII in FIG. 6.

FIG. 7 is an enlarged sectional view showing a portion VII in FIG. 6. Edges of the recess 4b are chamfered to define tapered portions 4b1. There is a relation of W1<W3<W2 among a radial width W1 of the recess 4b, a radial width W2 thereof inclusive of the tapered portions 4b1 and a radial width W3 of the projection 3f on the pump body 3. Hence, the projection 3f is press fitted in the recess 4b as guided by the tapered portions 4b1. Incidentally, a relation of H<D exists between a depth D of the recess 4b and a height H of the projection 3f.

Returning to FIG. 6, a projection 4d and a minor projection 4e are formed on a right end face 4c of the pump cylinder 4. The projection 4d and the minor projection 4e are configured in the same way as the projection 3f and the minor projection 3g on the pump body 3, respectively. On the other hand, a recess 5d similar to the aforesaid recess 4b of the pump cylinder 4 is formed in a flange face 5c of the outer cylinder portion 5a of the bellows 5. As mentioned supra, the minor projection 4e may be formed on the bellows 5 rather than on the pump cylinder 4.

In the aforementioned arrangement, the individual members are assembled in the aforementioned manner. In the state where the pump cylinder 4, bellows 5 and air cylinder portion are confined between the external cover 11 and the pump body 3 with respect to the center axis, the external cover 11 is threadedly engaged with the pump body 3 so that the external cover 11 and the pump body 3 are axially fastened to each other, whereby the projection 3f and the projection 4d are press-fitted in the recess 4b and the recess 5d, respectively.

Figure 8:
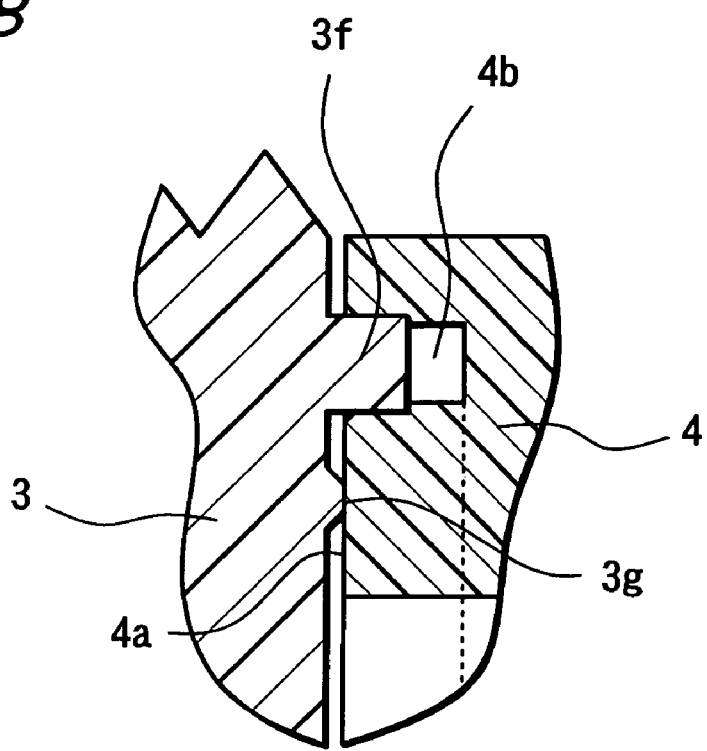
FIG. 8 and FIG. 9 are enlarged sectional views individually showing a state of the pump body and the pump cylinder of the pump of FIG. 1 being press-fitted with each other, and a state at completion of the press-fitting of the pump body and pump cylinder.
Figure 9:
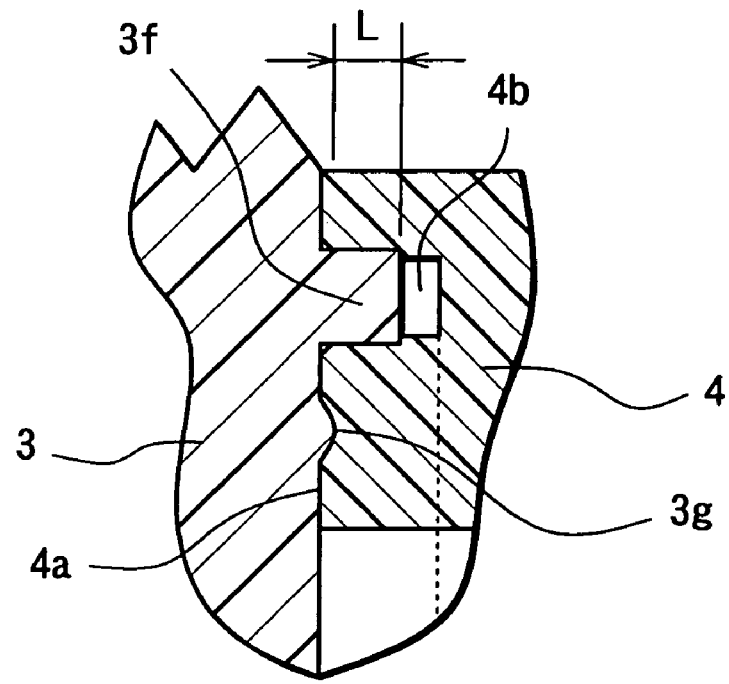

FIG. 8 and FIG. 9 are enlarged sectional views individually showing a state of the pump body 3 and the pump cylinder 4 being press-fitted with each other, and a state at completion of the press-fitting of the pump body and pump cylinder. Referring to FIG. 8, the degree of the press-fit increases as the fastening (threaded advance of the members) proceeds and the state shown in FIG. 9 is established when the fastening step is completed. In this state, inner and outer circumferential faces of the projection 3f and walls of the recess 4b are in radial pressure contact with each other for a length L along the center axis. The radial surface pressure forms a seal having a strong sealing power. On the other hand, the minor projection 3g, which is pressed against the left end face 4a of the pump cylinder 4, is half crushed and half wedged into the pump cylinder 4 as shown in the figure. In this state, the minor projection 3g has its pressure contact surface curved so as to produce a minor radial surface pressure component, thereby forming an auxiliary seal.

The same as the above occurs between the pump cylinder 4 and the bellows 5 so that seals are formed by the combination of the projection 4d and the recess 5d and by the minor projection 4e. In this manner, the pump cylinder 4 cooperates with the pump body 3 and with the bellows 5 to form therebetween the seals having the strong sealing power, thereby preventing the leakage of the chemical fluid. Thus is provided a pump of the external fluid type which features an excellent sealing performance.

Figure 10:
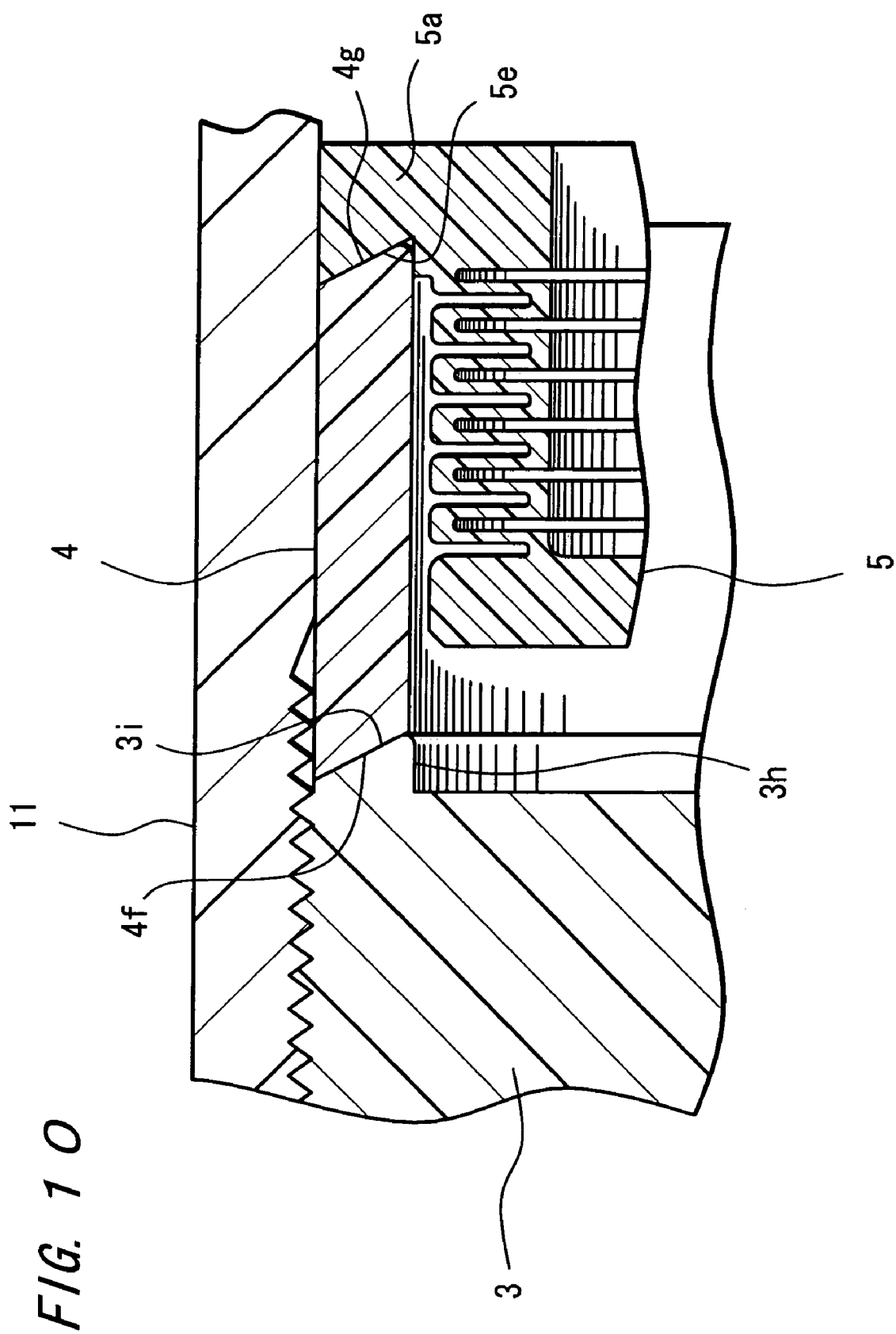
FIG. 10 is a fragmentary sectional view showing a principal part of a pump according to a second embodiment of the present invention.

FIG. 10 is a fragmentary sectional view showing a principal part of a pump according to a second embodiment of the present invention. The embodiment differs from the first embodiment in the structure of joints between the pump cylinder 4 and the pump body 3 and between the pump cylinder 4 and the bellows 5. Referring to the figure, laterally opposite ends of the pump cylinder 4 define tapered surfaces 4f, 4g. On the other hand, a ring-like projection 3h is formed near the outer periphery of the right end of the pump body 3. The projection 3h has a radial thickness slightly greater than that of the pump cylinder 4. An end face of the projection 3h defines a tapered surface 3i which is inclined at the same angle as the tapered surface 4f of the pump cylinder 4 but in the opposite direction thereto. Furthermore, the outer cylinder portion 5a of the bellows 5 is formed with a tapered surface 5e at the left end thereof, the tapered surface inclined at a somewhat different angle (about 5 to 10 degrees) from that of the tapered surface 4g of the pump cylinder 4 and in the opposite direction thereto.

When, in the above arrangement, the external cover 11 and the pump body 3 are fastened to each other, the fastening force brings the tapered surfaces 4f and 3i and the tapered surfaces 4g and 5e into mutually wedged relation where the tapered surfaces pressed against each other, thereby producing radial surface pressures. Thus are formed seals having a great sealing power. Although a pressure contact force perpendicularly acting on the tapered surfaces 4f, 3i causes the left end of the pump cylinder 4 to slide outwardly, the external cover 11 inhibits the sliding movement.

Figure 11:
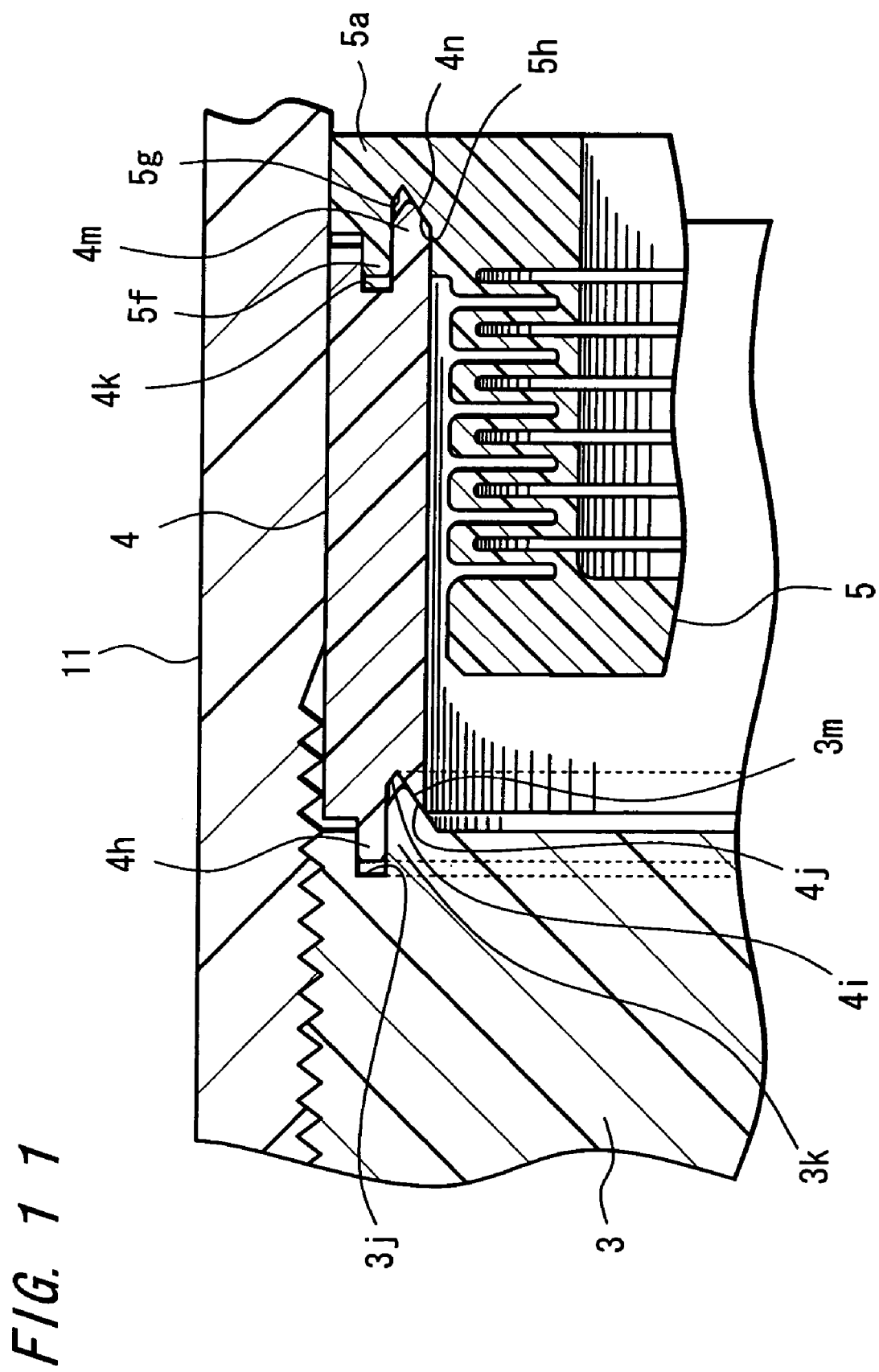
FIG. 11 is a fragmentary sectional view showing a principal part o f a pump according to a third embodiment of the present invention.

FIG. 11 is a fragmentary sectional view showing a principal part of a pump according to a third embodiment of the present invention. Likewise to the second embodiment, a difference from the first embodiment consists in a press-fit structure. Referring to the figure, a cylindrical projection 4h projects from the left end of the pump cylinder 4 along the center axis. The pump body 3 is formed with a circular recess 3j allowing for the press-fit of the projection 4h. On the other hand, a cylindrical projection 5f projects from the left end of the outer cylinder portion 5a of the bellows 5 along the center axis. The pump cylinder 4 is formed with a circular recess 4k allowing for the press-fit of the projection 5f.

Figure 12:
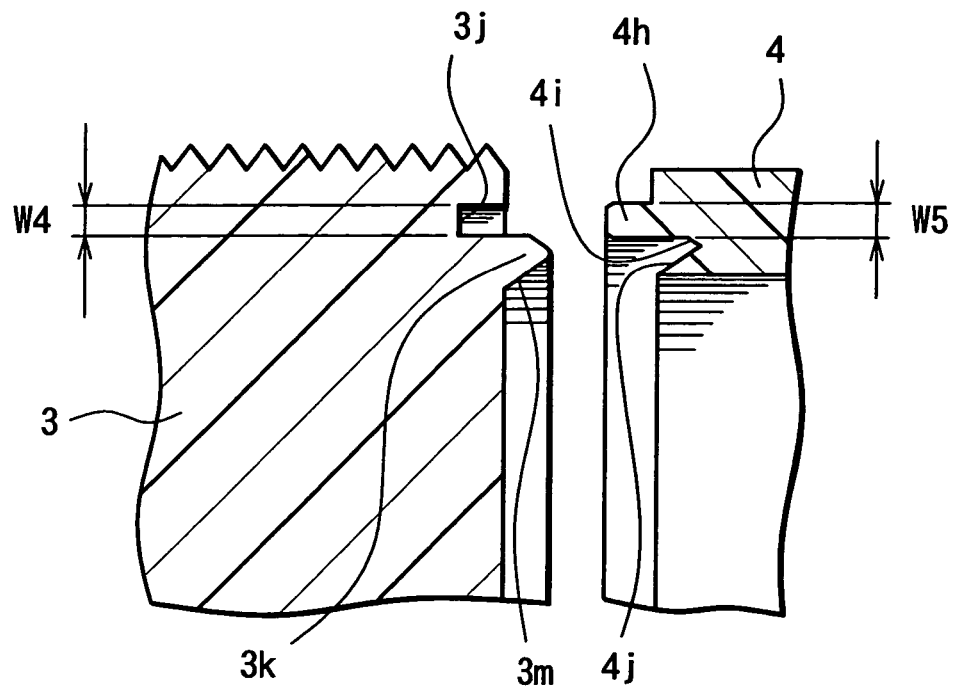
FIG. 12 and FIG. 13 are fragmentary sectional views individually showing a state prior to the press-fit of a pump body and a pump cylinder according to the third embodiment and a state of the pump body and pump cylinder being press-fitted with each other.
Figure 13:
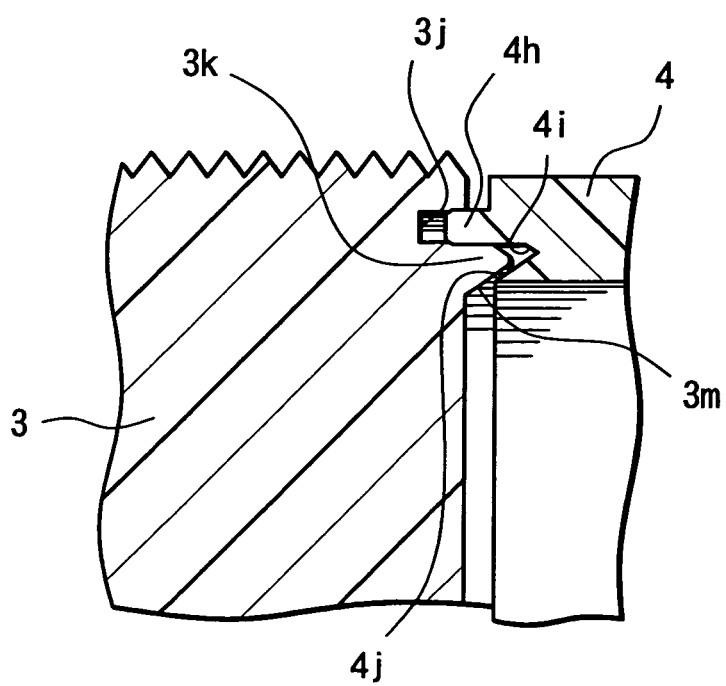

FIG. 12 is a fragmentary sectional view showing a state prior to the press-fit of the pump body and the pump cylinder according to the third embodiment, whereas FIG. 13 is a fragmentary sectional view showing a state of the pump body and pump cylinder being press-fitted with each other. Referring to FIG. 12, the pump body 3 is formed with a ring-like projection 3k inwardly of the recess 3j. The projection 3k is projected rightward along the center axis. A tapered surface 3m is formed on an inner periphery of the projection 3k. On the other hand, the pump cylinder 4 is formed with a circular recess 4i for receiving the above projection 3k. The recess 4i has a tapered surface 4j having the same or somewhat different (about 5 to 10 degrees) taper angle as or from that of the above tapered surface 3m. A width W4 of the recess 3j of the pump body 3 and a width W5 of the projection 4h of the pump cylinder 4 are in a relation of W4<W5.

Figure 14:
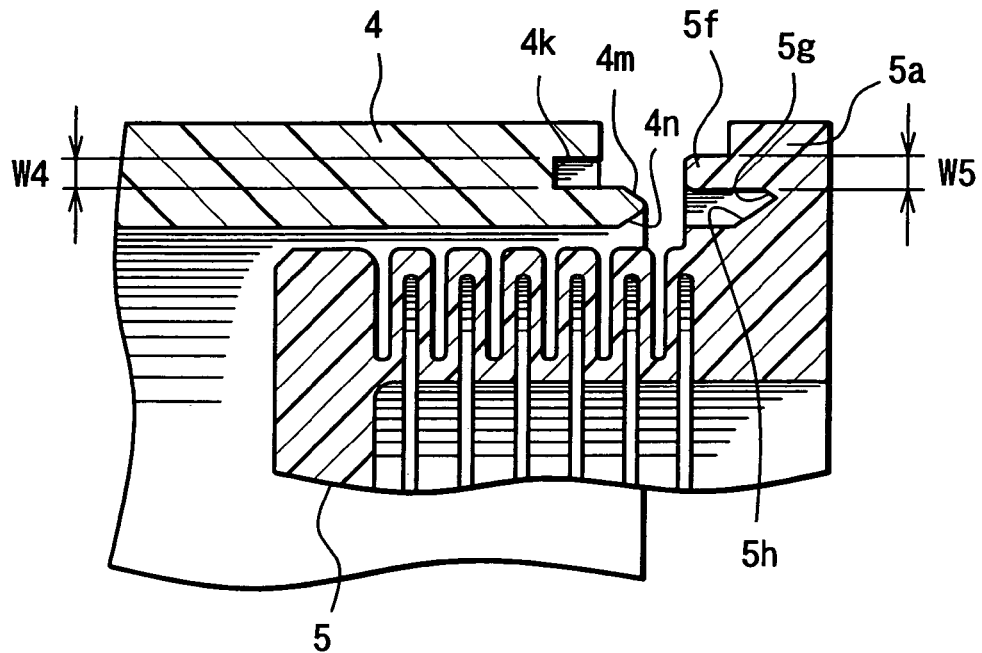
FIG. 14 and FIG. 15 are fragmentary sectional views individually showing a state prior to the press-fitting of the pump cylinder and a bellows according to the third embodiment and a state of the pump cylinder and the bellows being press-fitted with each other.
Figure 15:
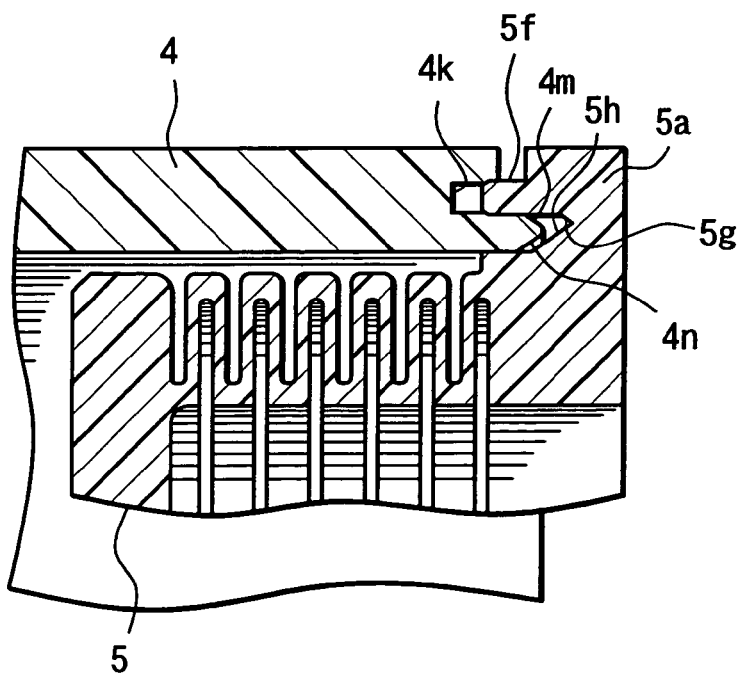

Similarly to the above, FIG. 14 is a fragmentary sectional view showing a state prior to the press-fit of the pump cylinder 4 and the bellows 5 according to the third embodiment, whereas FIG. 15 is a fragmentary sectional view showing a state of the pump cylinder and the bellows being press-fitted with each other. Referring to FIG. 14, the pump cylinder 4 is formed with a ring-like projection 4m inwardly of the recess 4k. The projection 4m is projected rightward along the center axis. An inner periphery of the projection 4m defines a tapered surface 4n. On the other hand, the bellows 5 is formed with a circular recess 5g for receiving the above projection 4m. The recess 5g has a tapered surface 5h having the same or somewhat different (about 5 to 10 degrees) taper angle as or from that of the above tapered surface 4n. A width W4 of the recess 4k of the pump cylinder 4 and a width W5 of the projection 5f of the bellows 5 are in the relation of W4<W5.

According to the pump of the third embodiment having the above press-fit structure, the projection 4h is press-fitted in the recess 3j by fastening the external cover 11 (FIG. 1) and the pump body 3 to each other, whereby the inner and outer circumferential faces of the projection 4h and the walls of the recess 3j are brought into radial pressure contact with each other. The radial surface pressures form a seal having a strong sealing power. By press-fitting the projection 4h to a degree to establish the state shown in FIG. 11, the projection 3k can be pressed against the recess 4i in a manner to be received therein. Due to the force fastening the external cover 11 and the pump body 3 to each other, a radial surface pressure occurs between the tapered surfaces 4j and 3m such that the sealing power is further increased.

By fastening the external cover 11 and the pump body 3 to each other, the projection 5f is press-fitted in the recess 4k, so that the inner and outer circumferential faces of the projection 5f and the walls of the recess 4k are brought into radial pressure contact with each other. The radial surface pressure forms a seal having a strong sealing power. By press-fitting the projection 5f to a degree to establish the state shown in FIG. 11, the projection 4m can be pressed against the recess 5g in a manner to be received therein. Due to the force fastening the external cover 11 and the pump body 3 to each other, a radial surface pressure occurs between the tapered surfaces 4n and 5h such that the sealing power is further increased.

It is noted that the press-fit structure is not limited to the foregoing embodiments and various other structures may be made. In short, the structure may be arranged such that the sealing portions in opposed relation are provided in correspondence to each connection portion between the pump cylinder 4 and the pump body 3 and between the pump cylinder 4 and the bellows 5 and that the sealing portions are brought into the mutually wedged relation by fastening the external cover 11 and the pump body 3 to each other. As mentioned supra, it is also possible to form the pump body 3 and the pump cylinder 4 into one piece. In this case, the sealing portions may be provided only at the pump cylinder 4 and the bellows 5.

While the above pump has been described on assumption that the pump serves to transport the chemical fluid containing fluorine and the like, it goes without saying that the pumps having the press-fit structures illustrated by the foregoing embodiments may be applied to a variety of fluids requiring the high sealing performance.

What is claimed is:

1. A fitted assembly bellows pump for generating a pumping action based on reciprocal movements of an air cylinder portion to thereby suck and discharge a fluid via valves, comprising:
   a pump body including an in-flow passage and an out-flow passage for the fluid;
   a pump cylinder formed on one end of said pump body;
   a bellows formed from a resin and capable of being extended or contracted in said pump cylinder and along a center axis;
   an air cylinder portion for extending or contracting said bellows; and
   check valves disposed within the pump body facing a pumping chamber defined by said pump body, pump cylinder and bellows and alternately operative to open and close in conjunction with the extension and contraction of said bellows to thereby alternately suck and discharge the fluid,
   wherein the fitted assembly formed by at least partially fitting said pump cylinder, bellows and air cylinder portion with each other is tightly inserted in an external cover and constrained on the opposite ends thereof for come-off prevention.

2. The fitted assembly bellows pump according to claim 1, wherein
   said external cover comprises a cylindrical body, one end of which is formed with a thread on an inside thereof for threadedly engaging a thread formed on an outside of said pump body, and the other end of which is formed with a stopper portion.

3. The fitted assembly bellows pump according to claim 1, wherein
   said external cover and all the other pump components are formed from resin materials.

4. A fitted assembly bellows pump for generating a pumping action based on reciprocal movements of an air cylinder portion to thereby suck and discharge a fluid via valves, comprising:
   a pump body including an in-flow passage and an out-flow passage for the fluid;
   a pump cylinder provided at one end of said pump body;
   a bellows capable of being extended or contracted in said pump cylinder and along a center axis and cooperating with said pump body and pump cylinder to form a pumping chamber;
   an air cylinder portion for extending or contracting said bellows; and
   an external cover enclosing therein said pump cylinder, bellows and air cylinder portion and threadedly engaging said pump body for fastening with each other along said center axis while cooperating with the pump body to clamp these members therebetween with respect to said center axis, wherein sealing portions in opposed relation are provided in correspondence to a connection area between at least one of said pump body and bellows and said pump cylinder and are wedged in each other according to the fastening by said external cover and pump body to thereby form a seal.

5. The fitted assembly bellows pump according to claim 4, wherein one of said sealing portions has a ring-like projection portion whereas the other sealing portion has a recess portion allowing the projection portion to be press-fitted therein.

6. The fitted assembly bellows pump according to claim 5, wherein said sealing portions are formed from a resin and a ring-like minor projection having a height smaller than said projection portion is formed on only one of said sealing portions.

7. A fitted assembly bellows pump for generating a pumping action based on reciprocal movements of an air cylinder portion to thereby suck and discharge a fluid via valves, comprising:

a pump body including an in-flow passage and an out-flow passage for the fluid;

a pump cylinder provided at one end of said pump body;

a bellows capable of being extended or contracted in said pump cylinder and along a center axis and cooperating with said pump body and pump cylinder to form a pumping chamber;

an air cylinder portion for extending or contracting said bellows;

an external cover enclosing therein said pump cylinder, bellows and air cylinder portion and threadedly engaging said pump body for fastening with each other along said center axis while cooperating with the pump body to clamp these members therebetween with respect to said center axis, and a plurality of check valves juxtaposed on the in-flow passage of said pump body.

8. The fitted assembly bellows pump according to claim 7, further comprising a plurality of check valves juxtaposed on the out-flow passage of said pump body.

9. The fitted assembly bellows pump according to claim 8, installed in a manner that said center axis extends horizontally and that the check valves for discharge are disposed at an upper place whereas the check valves for suction are disposed at a lower place.

* * * * *